United States Patent
Mutter et al.

(10) Patent No.: US 11,909,553 B2
(45) Date of Patent: Feb. 20, 2024

(54) FRAME SCREENING UNIT, USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 474 days.

(21) Appl. No.: 17/268,048

(22) PCT Filed: Aug. 8, 2019

(86) PCT No.: PCT/EP2019/071339
§ 371 (c)(1),
(2) Date: Apr. 5, 2021

(87) PCT Pub. No.: WO2020/035392
PCT Pub. Date: Feb. 20, 2020

(65) Prior Publication Data
US 2021/0320816 A1  Oct. 14, 2021

(30) Foreign Application Priority Data

Aug. 17, 2018 (DE) .......................... 102018213914.8
Jan. 11, 2019 (DE) .......................... 102019200289.7

(51) Int. Cl.
*G06F 13/42* (2006.01)
*H04L 12/40* (2006.01)
*H04L 12/413* (2006.01)

(52) U.S. Cl.
CPC .... *H04L 12/40032* (2013.01); *G06F 13/4282* (2013.01); *H04L 12/413* (2013.01); *H04L 2012/40215* (2013.01)

(58) Field of Classification Search
CPC . G06F 1/12; G06F 11/07; G06F 13/40; G06F 13/42; G06F 13/362;
(Continued)

(56) References Cited

U.S. PATENT DOCUMENTS

2014/0351359 A1* 11/2014 Grocutt ..................... G06F 1/12
  709/209
2016/0224501 A1*  8/2016 Nickel .............. H04L 12/40032

FOREIGN PATENT DOCUMENTS

CN    106094800 A    11/2016
DE    102010030422 A1  12/2011
(Continued)

OTHER PUBLICATIONS

International Search Report for PCT/EP2019/071339, dated Oct. 28, 2019.

*Primary Examiner* — Shawkat M Ali
(74) *Attorney, Agent, or Firm* — NORTON ROSE FULBRIGHT US LLP (57) ABSTRACT

A frame screening unit for a user station of a serial bus system, a user station for a serial bus system, and a method for communicating in a serial bus system. The frame screening unit includes a screen block for generating a select signal that selects whether or not a communication control device of the user station is allowed to receive a reception signal that has been generated from a frame received serially at that time from the bus for a message, and a reception signal selection block for screening the reception signal, as a function of the select signal generated by the screen block, so that the reception signal is not transmitted to the communication control device of the user station.

14 Claims, 5 Drawing Sheets

(58) Field of Classification Search
CPC ........ G06F 13/4282; H04J 3/24; H04L 12/40;
H04L 12/413; H04L 12/40019; H04L
12/40032; H04L 25/03; H04L 29/12;
H04L 2012/40215
USPC ......... 370/241; 375/219, 295, 316; 709/209;
710/106
See application file for complete search history.

(56) References Cited

FOREIGN PATENT DOCUMENTS

| | | |
|---|---|---|
| DE | 102014208788 A1 | 12/2014 |
| DE | 102013220377 A1 | 4/2015 |
| JP | 2015213308 A | 11/2015 |
| JP | 2016504873 A | 2/2016 |
| JP | 2017069615 A | 4/2017 |

\* cited by examiner

FRAME SCREENING UNIT, USER STATION FOR A SERIAL BUS SYSTEM, AND METHOD FOR COMMUNICATING IN A SERIAL BUS SYSTEM

FIELD

The present invention relates to a frame screening unit, a user station for a serial bus system, and a method for communicating in a serial bus system that operates with a high data rate and a high level of error robustness. A communication in the bus system is selectively possible according to a first communication protocol or a second communication protocol.

BACKGROUND INFORMATION

For the communication between sensors and control units, for example in vehicles, a bus system is frequently used in which data are transmitted as messages under the ISO 11898-1:2015 standard, as a CAN protocol specification with CAN FD. The messages are transmitted between the bus users of the bus system, such as the sensor, control unit, transducer, etc.

With the increasing number of functions of a technical facility or of a vehicle, the data traffic in the bus system also increases. Moreover, it is often necessary for the data to be transmitted from the transmitter to the receiver more quickly than previously. As a result, the required bandwidth of the bus system is further increased.

To allow data to be transmitted at a higher bit rate than with CAN, an option has been provided in the CAN FD message format for switching over to a higher bit rate within a message. With such technologies, the maximum possible data rate is increased beyond a value of 1 Mbit/s by using higher clocking in the area of the data fields. Such messages are also referred to below as CAN FD frames or CAN FD messages. With CAN FD, the useful data length of 8 bytes is increased up to 64 bytes, and the data transmission rates are much higher than with CAN.

Even though a CAN- or CAN FD-based communications network provides a very large number of advantages with regard to its robustness, for example, its speed is much slower compared to a data transmission via 100Base-T1 Ethernet, for example. In addition, the useful data length of up to 64 bytes, achieved thus far with CAN FD, is too small for some applications.

In order to refine CAN- or CAN FD-based communications networks, a simple migration of existing bus systems must be made possible, so that user stations that still operate according to the existing CAN protocol specifications may also coexist in the bus system with user stations that already communicate according to a successor CAN protocol specification.

SUMMARY

The object of the present invention, therefore, is to provide a frame screening unit, a user station for a serial bus system, and a method for communicating in a serial bus system which solve the above-mentioned problems. In particular, a frame screening unit, a user station for a serial bus system, and a method for communicating in a serial bus system are provided in which a high data rate and an increase in the quantity of the useful data per frame may be achieved with a high level of error robustness.

The object may achieved by a frame screening unit for a user station of a serial bus system in accordance with an example embodiment of the present invention. The frame screening unit includes a screen block for generating a select signal that selects whether or not a communication control device of the user station is allowed to receive a reception signal that has been generated from a frame for a message that is serially received at that time from the bus, and a reception signal selection block for screening the reception signal, as a function of the select signal generated by the screen block, so that the reception signal is not transmitted to the communication control device of the user station.

The frame screening unit makes it possible for first user stations of the bus system in a first communication phase to use the same communication format, which may also be referred to as a data transmission standard, as second user stations, but in a second communication phase to use a different communication format than the second user stations, which does not interfere with the communication of the second user stations. For this purpose, the frame screening unit may provide screening of frames of the second user stations from the host user station for a predetermined time period, namely, in a screening phase, and thus (at least/also) during the second communication phase. In addition, for a predetermined time period, namely, in the screening phase, the frame screening unit may prevent the host user station itself from transmitting a frame on the bus while a frame is being transmitted on the bus from one of the second user stations.

As a result, due to the frame screening unit, the communication in the new communication format is not disturbed by frames having the old or some other communication format on the bus. Thus, in a first communication phase a conventional VVAN arbitration may be carried out, and in a second communication phase the transmission rate may still be increased considerably compared to CAN FD. The second communication phase is contained in particular in the screening phase.

Due to the coexistence and interoperability of user stations that operate according to the CAN FD communication protocol, and user stations that operate according to a CAN FD successor communication protocol, referred to below as CAN FE, a seamless migration path of CAN FD toward CAN FE is possible. In particular, individual user stations of the bus system, which still are to use only CAN FD, may be retrofitted with the frame screening unit described above. If necessary, CAN FE user stations, which are not able to transmit and receive CAN FD frames, may be equipped from the outset with an appropriately modified frame screening unit. Therefore, no gateways between CAN FD and CAN FE bus systems are necessary.

Advantageous further embodiments of the frame screening unit are disclosed herein.

According to one particular embodiment variant of the present invention, the screen block is designed to generate, instead of the reception signal of the frame received from the bus, a reception signal in such a way that the communication control device of the user station goes into a protocol exception state in which the communication control device abandons a transmission of a transmission signal to the bus, and the reception signal selection block being designed to transmit the reception signal, generated by the screen block, to the communication control device of user station 10 as a function of the select signal generated by the screen block.

It is possible for the screen block to be designed to place an FDF bit and a res bit in the reception signal, generated by the screen block, in such a way that the communication control device of the user station goes into a protocol exception state in which the communication control device abandons a transmission of a transmission signal to the bus.

According to various exemplary embodiments, a detect block may be provided for detecting, from the frame serially received from the bus, a start condition and an end condition for the screening of the reception signal that has been generated from the frame serially received from the bus, the screen block being designed to generate the select signal as a response to a detection result of the detect block.

According to one option, the detect block is designed to carry out a sequential decoding of the reception signal for evaluating the reception signal. Additionally or alternatively, the detect block is optionally designed to evaluate the reception signal in order to find the start condition and/or end condition, based on a format of a frame whose data transmission standard is understood by the communication control device of the user station.

The detect block may possibly be designed to detect and evaluate a state on the bus in order to detect the start condition and the end condition. Additionally or alternatively, the detect block may possibly be designed to evaluate a digital reception signal, generated from the frame received from the bus, in order to detect the start condition and the end condition.

The detect block may be designed to output to the screen block a detection signal in which the start condition is encoded as an edge change that differs from an edge change for the end condition.

It is possible for portions of the frame, which are transmitted via a data transmission standard that the communication control device of the user station does not understand, to also be contained between the start condition and the end condition.

Additionally or alternatively, it is possible for the start condition to be the predetermined value of at least one bit of the reception signal that has been generated from an arbitration field of a frame serially received at that time from the bus. Additionally or alternatively, it is possible for the start condition to be the predetermined value of at least one state of signals on the bus, the end condition being defined after the end of a communication phase in which data of the frame are transmitted via a data transmission standard that the communication control device of the user station does not understand.

According to one exemplary embodiment, the frame screening unit also includes a transmission signal generation block for generating a transmission signal, in which all bits are transmitted in such a way that their bus states on the bus are overwritable until the end condition of the received frame is reached.

In a first communication phase for transmitting the message on the bus, it is possibly negotiated, between the user stations of the bus system, which of the user stations in a subsequent second communication phase has, at least temporarily, exclusive, collision-free access to the bus of the bus system, the second communication phase encompassing the transmission of a data field in which useful data of the message are transmitted on the bus.

The frame screening unit described above may be part of a user station for a serial bus system, the user station also including a communication control device for transmitting a message to a bus of the bus system and/or for receiving a message from the bus of the bus system, and a transceiver device for transmitting the message on the bus and/or for receiving messages from the bus, the frame screening unit being connected to the communication control device and to the transceiver device, and the transceiver device being designed, regardless of the bit rate of a frame of the message, to generate during the transmission a first bus state for a first digital data state of the messages, and a second bus state for the second digital data state of the messages, in such a way that the second bus state may overwrite the first bus state.

The user station described above may be a first user station of a bus system that also includes a bus, and at least one second user station that is connected to the at least one first user station via a bus line for the bus in such a way that the at least one first user station and the at least one second user station may communicate serially with one another, the data transmission standard of frames for the messages of the at least one first user station differing, at least in part, from a data transmission standard of the at least one second user station.

Moreover, the object stated above is achieved by a method for communicating in a serial bus system according to an example embodiment of the present invention. The method includes the steps: transmitting, via a transceiver device, messages on a bus of the bus system and/or receiving, via the transceiver device, messages from the bus of the bus system, generating, via a screen block of a frame screening unit, a select signal that selects whether or not a communication control device of a user station of the bus system is allowed to receive a reception signal that has been generated from a frame for a message received serially from the bus at that time, and screening, via a reception signal selection block, the reception signal as a function of the select signal generated by the screen block, so that the reception signal is not transmitted to the communication control device of the user station.

The method provides the same advantages as stated above with regard to the frame screening unit and the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
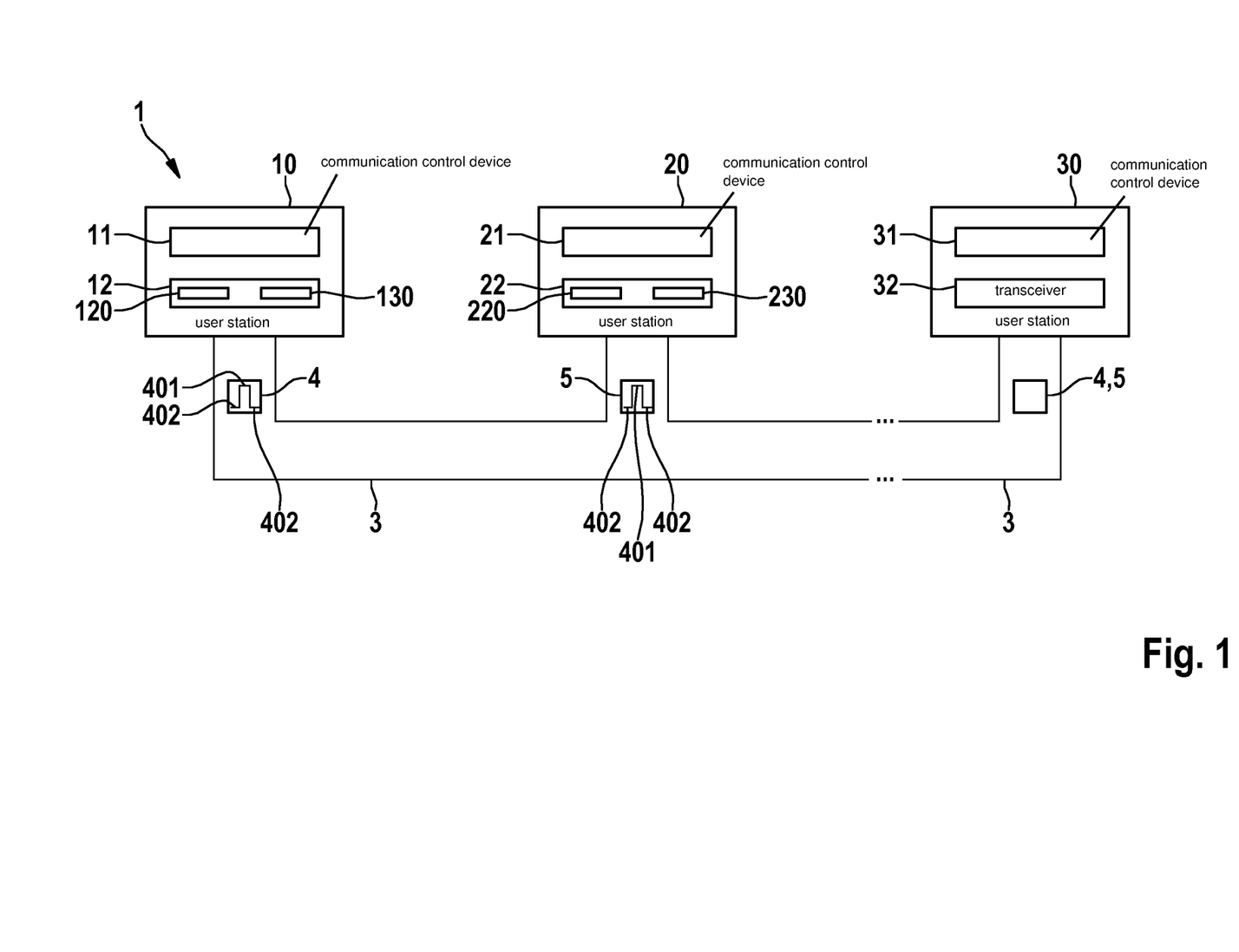
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN FE bus system, and/or modifications thereof, as described below. Bus system 1 may be used in a vehicle, in particular a motor vehicle, an aircraft, etc., or in a hospital, and so forth.

In FIG. 1, bus system 1 includes an in particular parallel bus line 3 to which a plurality of user stations 10, 20, 30 is connected. Messages 4, 5 in the form of signals are serially transmittable between individual user stations 10, 20, 30 via bus line 3. For this purpose, dominant levels or states 401 or recessive levels or states 402, shown in a highly schematic manner only for user stations 10, 20, are used in the signals. States 401, 402 correspond to the states of a TX signal of a transmitting user station 10, 20, 30. After transmission of signals CAN_H and CAN_L as a differential bus signal on bus line 3, the signals are received by user stations 10, 20, 30 as an RX signal. User stations 10, 20, 30 are, for example, control units, sensors, display devices, etc., of a motor vehicle.

As shown in FIG. 1, user station 10 includes a communication control device 11 and a transceiver device 12 that includes a transceiver unit 120 and a frame screening unit 130. In contrast, user station 20 includes a communication control device 21 and a transceiver device 22 that includes a transceiver unit 220 and a frame screening unit 230. User station 30 includes a communication control device 31 and a transceiver device 32. Transceiver devices 12, 22, 32 of user stations 10, 20, 30 are each directly connected to bus line 3, although this is not illustrated in FIG. 1.

Communication control devices 11, 21, 31 are each used for controlling a communication of particular user station 10, 20, 30 via bus line 3 with another user station of user stations 10, 20, 30 connected to bus line 3.

Communication control device 11 may be designed as a conventional CAN controller. Communication control device 11 creates and reads first messages 4, for example conventional CAN messages 4. Conventional CAN messages 4 are built up according to the conventional base format, in which a number of up to 8 data bytes may be included in message 4. Alternatively, conventional CAN message 4 is built up as a CAN FD message in which a number of up to 64 data bytes may be included, which in addition are transmitted at a much faster data rate than for conventional CAN message 4. In the latter case, communication control device 11 is designed as a conventional CAN FD controller.

Communication control device 21 creates and reads second messages 5, which are modified CAN messages 5, for example. Modified CAN messages 5 are built up based on a CAN FE format, described in greater detail with reference to FIG. 2.

Communication control device 31 may be designed to provide a conventional CAN message 4 or a CAN FE message 5 for transceiver device 32 or to receive same from the transceiver device, as needed. Communication control device 31 thus creates and reads a first message 4 or second message 5, first and second messages 4, 5 differing by their data transmission standard, namely, CAN or CAN FE in this case. Alternatively, conventional CAN message 4 is built up as a CAN FD message. In the latter case, communication control device 11 is designed as a conventional CAN FD controller.

Transceiver device 12 may be designed as a conventional CAN transceiver or CAN FD transceiver. Transceiver device 22, except for the differences described in greater detail below, may be designed as a CAN FE transceiver. Transceiver device 32 may be designed to provide messages 4 according to the CAN base format at that time or messages 5 according to the CAN FE format for communication control device 31 or to receive same from the communication control device, as needed. Transceiver devices 22, 32 may additionally or alternatively be designed as a conventional CAN FD transceiver.

Formation and then transmission of messages 5 with the CAN FE format, as well as the receipt of such messages 5, may be achieved by use of the two user stations 20, 30.

Figure 2:
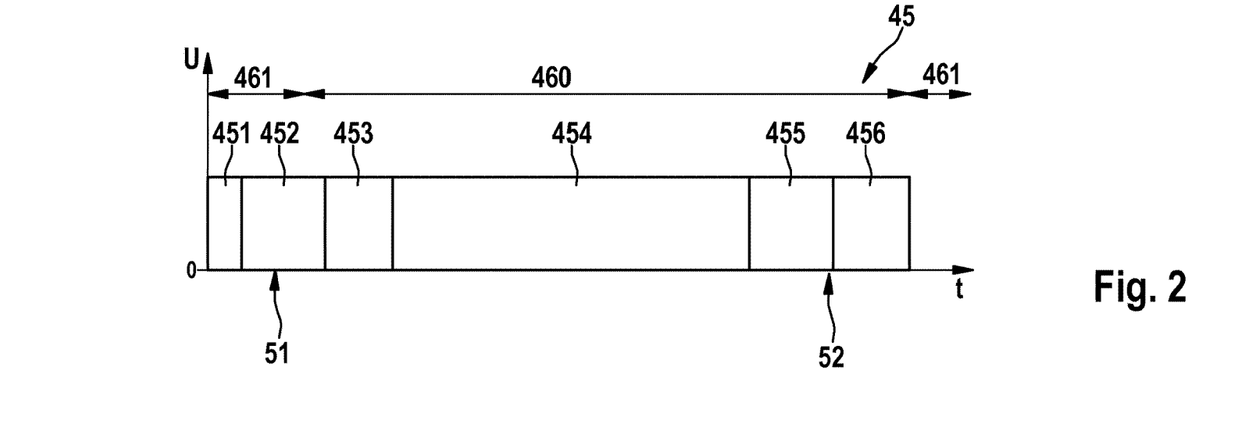
FIG. 2 shows a diagram for illustrating the design of messages that may be transmitted from user stations of the bus system according to the first exemplary embodiment of the present invention.

FIG. 2 shows for message 5 a CAN FE frame 45, which is transmitted from transceiver device 22 or transceiver device 32.

CAN FE frame 45 is divided into different fields for the CAN communication on bus line 3, namely, a start field 451, an arbitration field 452, a control field 453, a data field 454, a check sum field 455, and an end field 456.

Start field 451 includes one bit, for example, also referred to as SOF bit, and indicates the start of frame. Arbitration field 452 contains an identifier including 32 bits, for example, for identifying the transmitter of the message. Arbitration field 452 may additionally contain a piece of protocol format information made up of one or multiple bits, which is suitable for distinguishing CAN FE frames from CAN frames or CAN FD frames.

Control field 453 contains a data length code that is 13 bits long, for example, which may then assume values from 1 to 4096 with an increment of 1, or also values from 0 to 4095. The data length code may also include fewer or more bits, and the value range and the increment may assume other values. Control field 453 may additionally contain a piece of protocol format information made up of one or multiple bits, which is suitable for distinguishing CAN FE frames from CAN frames or CAN FD frames.

Data field 454 contains the useful data of the CAN FE frame or of message 5. The useful data may include up to 4096 bytes, for example, corresponding to the value range of the data length code. Check sum field 455 contains a check sum concerning the data in data field 454, including the stuff bits, which are inserted by the transmitter of message 5 as inverse bits after every 10 identical bits. End field 456 contains at least one acknowledge bit, and also a sequence of 11 identical bits that indicate the end of CAN FE frame 45. The at least one acknowledge bit may be used to communicate whether or not a receiver has discovered an error in received CAN FE frame 45 or message 5.

A physical layer, similarly as with CAN and CAN FD, is used in the phases for transmitting arbitration field 452 and end field 456. The physical layer corresponds to the bit transmission layer or layer 1 of the conventional Open Systems Interconnection (OSI) model. An important point during these phases is that the CSMA/CR method is used, which allows simultaneous access of user stations 10, 20, 30 to bus line 3 without destroying higher-priority message 4, 5.

It is thus possible to add further bus user stations 10, 20, 30 to bus system 1 in a relatively simple manner, which is very advantageous.

Consequently, the CSMA/CR method must provide so-called recessive states on bus line 3, which may be overwritten by other user stations 10, 20, 30 with dominant states on bus line 3.

In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

Control field 453 and data field 454 are transmitted by a transmitter of message 5 to bus line 3 only after user station 20, as the transmitter, has obtained the arbitration, and user station 20, as the transmitter for transmitting fields 453 through 456, thus has exclusive access to bus line 3 of bus system 1. During the arbitration, with the aid of the identifier in arbitration field 452, bit-by-bit negotiation is carried out between user stations 10, 20, 30 concerning which user station 10, 20, 30 would like to transmit message 4, 5 having the highest priority, and therefore for the next time period for transmitting fields 453 through 455, obtains exclusive access to bus line 3 of bus system 1.

The arbitration at the start of a frame 45 or of message 4, 5, and the acknowledgement in end field 456 at the end of frame 45 or of message 4, 5, is possible only when the bit time is much more than twice as long as the signal propagation time between two arbitrary user stations 10, 20, 30 of bus system 1. Therefore, the bit rate in the arbitration phase during transmission of fields 451, 452, 456 is selected to be slower than in the other fields of frame 45.

The provided new development "CAN FE" is intended to have the following properties which differ from CAN or CAN FD:
  a) acquiring and optionally adapting proven properties that are responsible for the robustness and user-friendliness of CAN and CAN FD, in particular a frame structure including identifiers and arbitration according to the CSMA/CR method,
  b) increasing the net data transmission rate to approximately 10 megabits per second,
  c) increasing the quantity of the useful data per frame 450 to approximately 4 kbytes,
  d) optional: completely or partially dispensing with the sending of error frames when errors are detected.

The arbitration, compared to conventional CAN and CAN FD, runs unchanged according to the CSMA/CR method. Thus, during the arbitration there are still only two bus states, "positive dominant" and "recessive." The effort for the initial implementation and the changeover to the bus system according to the present invention is thus reduced. By use of suitable measures, coexistence of the CAN FE frame with CAN frames and/or CAN FD frames, or a tolerance of CAN and CAN FD user stations with respect to CAN FE frames, may also be made possible.

Figure 3:
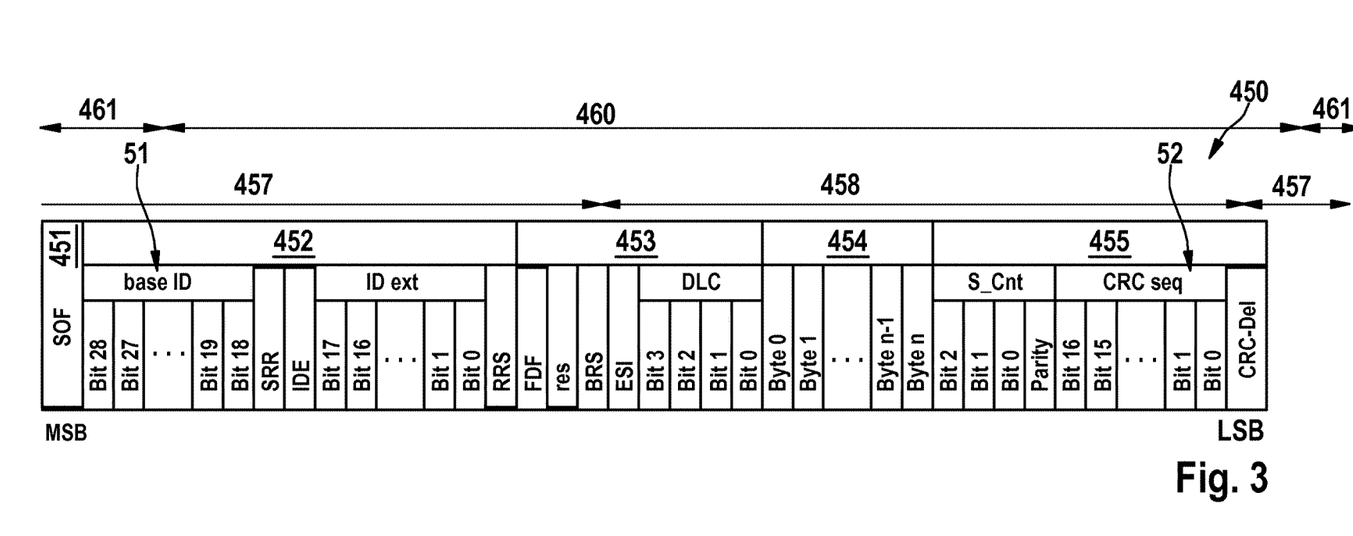
FIG. 3 shows the format of CAN FD frames according to the above-mentioned ISO 11898-1:2015 standard.

FIG. 3 shows a frame 450, transmitted from one of user stations 10, 30, for a message 4 that includes up to 64 data bytes in the CAN FD format. Frame 450 begins with an MSB bit and ends with an LSB bit. Frame 450 includes an SOF bit 451 that corresponds to the MSB bit, as well as the above-mentioned frame fields, the same as for a CAN FE frame 45, namely, arbitration field 452, control field 453, data field 454, and check sum field (CRC field) 455.

In the base ID field and the ID ext field, arbitration field 452 includes an identifier of frame 45 in which a start condition 51 may also be defined, as described in greater detail below with reference to FIGS. 3 and 4. An SRR bit and an IDE bit are provided between the base ID field and the ID ext field. An RRS bit is situated at the end of arbitration field 452.

Control field 453 begins with an FDF bit, followed by a res bit. This is followed by a BRS bit and an ESI bit. Control field 453 ends with a DLC field. Data field 454 is not present when the DLC field of control field 453 has the value 0.

Check sum field 455 contains in an S Cnt field the number of stuff bits modulo 8 which according to the bit stuffing rule have been inserted into frame 450; namely, after every five identical bits, a bit that is inverse thereto is to be inserted. In addition, check sum field 455 in a CRC seq field contains a CRC check sum, and ends with a subsequent CRC delimiter CRC-Del. An end condition 52 may also be defined here, which is described in greater detail below with reference to FIGS. 3 and 4.

The stated fields and bits are described in ISO 11898-1: 2015, and therefore are not described in greater detail here.

The length of a first communication phase 457 in the present exemplary embodiment is indicated in FIG. 3. First communication phase 457 includes an arbitration phase as well as a subsequent format switchover phase, which encompasses the phase between the FDF bit and the BRS bit, and in which the arbitration is already concluded. The FDF bit specifies whether or not a CAN FD frame 450 is involved. At the BRS bit, the format is switched from the slow bit rate in the arbitration phase to the faster bit rate of a second communication phase 458, based on the FDF bit.

First communication phase 457 is followed by second communication phase 458 if the BRS bit in frame 450 is recessive. In addition, a screening phase 460 is illustrated, which is situated between start condition 51 and the end of the IMF field (which follows the frame end and is not shown in FIG. 3), and during which portions of frame 450 are screened, as described in greater detail below with reference to FIG. 4.

FIG. 3 illustrates dominant bits via a broad line at the lower edge of frame 45. Recessive bits are illustrated in FIG. 3 via a broad line at the upper edge of frame 45.

As shown in FIG. 3, associated communication control device 11, 31 of the transmitter has created frame 450 in such a way that the SOF bit, the RRS bit, and the res bit are dominant, whereas the SRR bit, the IDE bit, the FDF bit, and CRC delimiter CRC-Del are recessive.

In accordance with the present invention, CAN FE and CAN FD nodes, for example user stations 10, 20, 30, may be operated at the same bus, even if the CAN FE protocol is not compatible with the CAN FD protocol. The bus is formed by bus line 3.

Advantages

Favorable migration path: Individual electronic control units (ECUs) may be upgraded to CAN FE without the entire bus having to "speak" CAN FE.

Greater acceptance of CAN FE and CAN FD when their coexistence is possible.

Saving bus line 3, since bus line 3 may be jointly utilized. Thus, a separate bus is not needed for CAN FE.

Introduction

If CAN FE (or some other CAN-like protocol) and CAN FD are not compatible but both are to be operated at the same bus, i.e., connected to same bus line 3, one approach is to "hide" the CAN FE frames or CAN FE frames 45 from the CAN FD users, namely, from user station 10 in the example from FIG. 1. This may take place via a so-called CAN FE screen unit, previously referred to as frame screening unit 130. Frame screening unit 130 is ideally also installed in appropriately configured CAN FD transceivers, as shown in FIG. 1. If user station 20 cannot understand CAN FD frame 450, frame screening unit 230 may be correspondingly adapted to the subsequent functions of frame screening unit 130.

In the example from FIG. 1 it is assumed that
the CAN FE protocol (i.e., frame format) is not compatible with the CAN FD or CAN protocol,
CAN FE and CAN FD use a compatible physical layer in the arbitration phase,
the node or user station 30 supports the CAN FE protocol as well as the CAN FD protocol in a similar way as present CAN FD protocol controllers support conventional CAN as well as CAN FD.
the node or user station 10 supports only the CAN FD protocol.
the node or user station 20 supports only the CAN FE protocol.

According to one example, user station 10 or user station 30 transmits a CAN FD frame, i.e., a frame 450 for a message 4, and subsequently transmits to user station 20 a CAN FE frame, i.e., a frame 45 for a message 5. The CAN FE node or user station 30 may receive both frames 45, 450. The CAN FD node or user station 10 can receive or understand only CAN FD frame 450. User station 20 can receive only the CAN FE frame, i.e., a frame 45 for a message 5.

Figure 4:
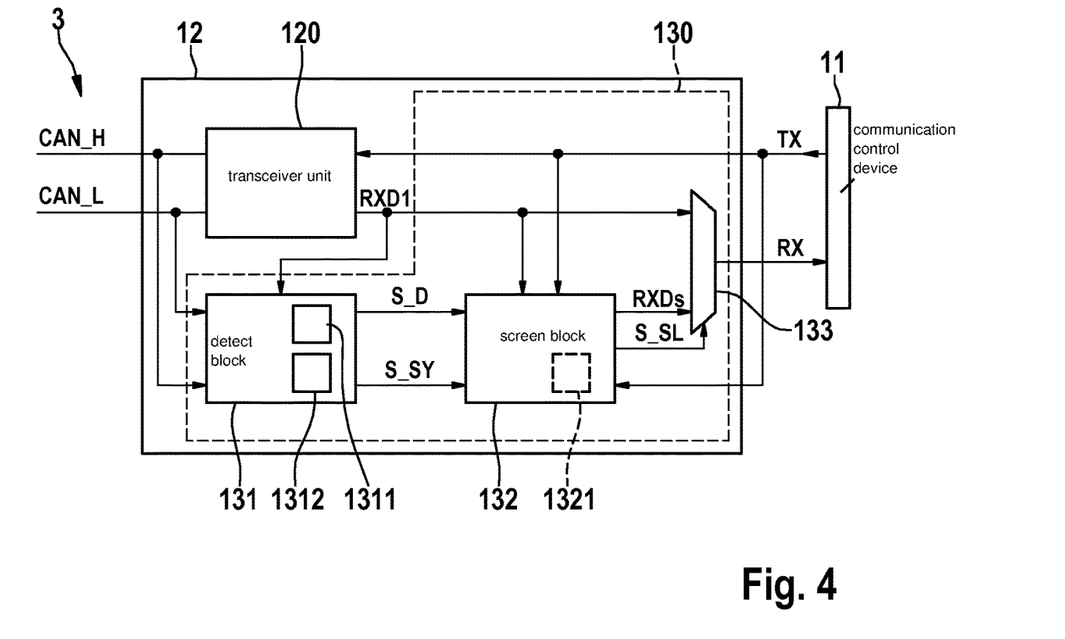
FIG. 4 shows a diagram for illustrating the design of a frame screening unit that is installed in user stations of the bus system according to the first exemplary embodiment of the present invention.

FIG. 4 shows a frame screening unit 130, which may also be referred to as a screen block, and which screens CAN FE frame 45 according to FIG. 2 during screening phase 460. At the same time, frame screening unit 130 ensures that the CAN FD node or user station 10 does not attempt to transmit a CAN FD frame 450 during the transmission of CAN FE frame 45 on the bus.

Ideally, a frame screening unit 130 is accommodated in the same housing, and possibly on the same silicon chip, as transceiver device 12, as shown in FIG. 1. A separate component or a separate chip is thus saved.

Figure 5:
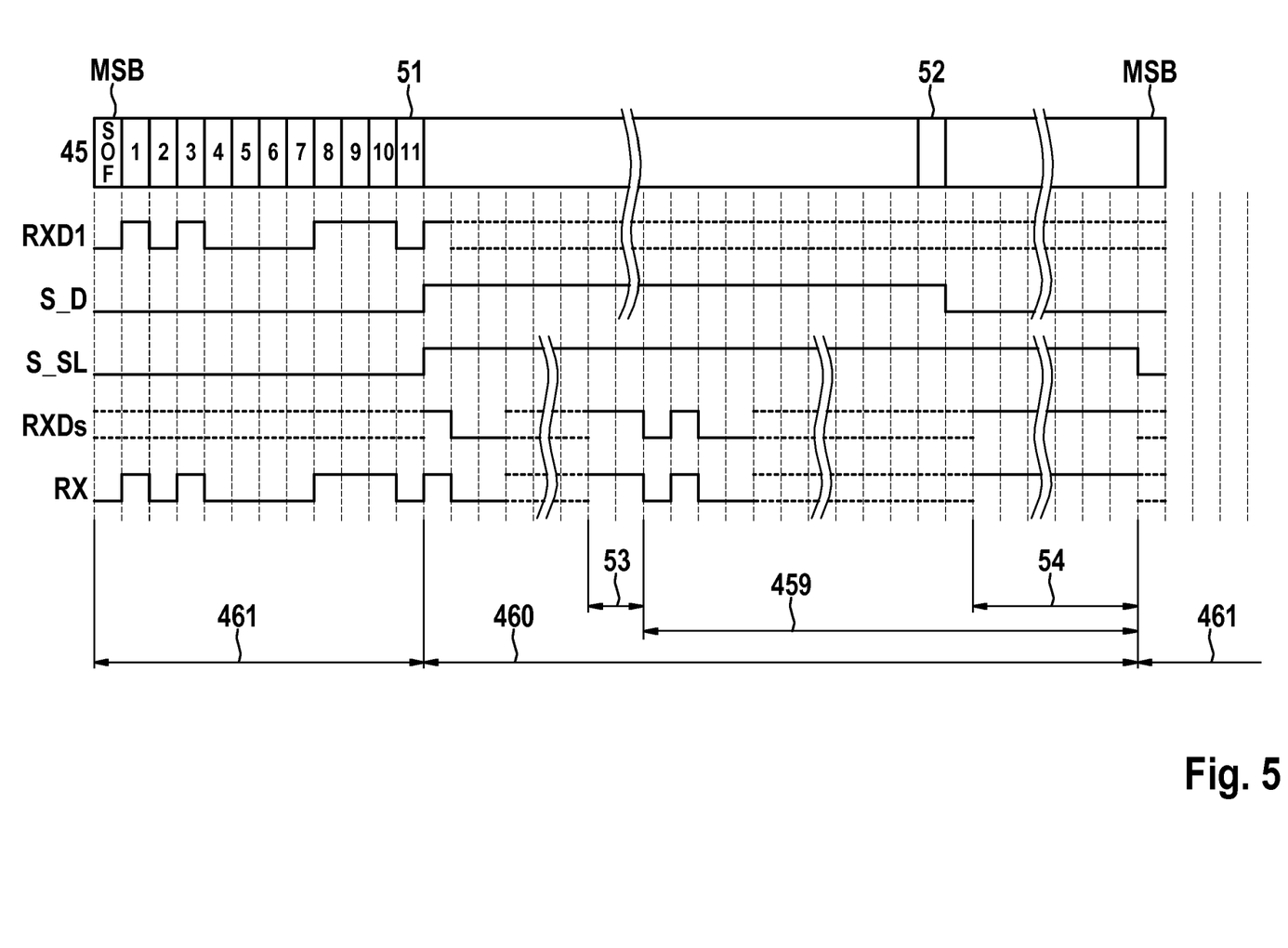
FIG. 5 shows a signal-time diagram for various signals that are transmitted according to the first exemplary embodiment of the present invention during operation of the bus system.

FIG. 4 shows transceiver device 12 as a transceiver with a CAN FE screen, and FIG. 5 shows a course of signals that arise here. Thus, transceiver device 12 according to FIG. 4 includes a transceiver unit 120 and a frame screening unit 130. Transceiver device 12 that is used, or its transceiver unit 120, must support the CAN FD physical layer as well as the CAN FE physical layer. However, communication control device 11 supports and understands only CAN FD frame 450.

Transceiver device 12 is connected to bus line 3, so that transceiver device 12 may transmit differential signals CAN_H, CAN_L for frame 450 on bus line 3, and may receive frames 45, 450 from bus line 3. A communication between user stations 10, 20, 30 may take place in this way.

Frame screening unit 130 (CAN FE screen block) is made up of the following function blocks: a detect block 131, a screen block 132, and a reception signal selection block 133.

Detect block 131 may interpret the CAN FD protocol to some extent; i.e., it contains a greatly simplified CAN FD protocol controller, namely, a communication control device 1311. In addition, detect block 131 may interpret the CAN FE protocol to some extent; i.e., it contains a greatly simplified CAN FE protocol controller, namely, a communication control device 1312.

Detect block 131 has two tasks, namely, detecting a start condition 51 (see above or FIG. 2, 3, or 5) upon which a nonscreening phase 461 ends and the screening operation of screen block 132, and thus screening phase 460 according to FIG. 2, 3, or 5, must be started, and detecting an end condition 52 (see above or FIG. 2, 3, or 5), upon which the end of the screening operation is started, or the screening operation, and thus screening phase 460 according to FIG. 2, 3, or 5, is ended. Start condition 51 (important property of the present invention) indicates at which location in frame 45, 450 that CAN FE frames 45 are no longer passed through to the CAN FD node, thus in the present example, to user station 10.

The CAN FE and CAN FD protocols are compatible during nonscreening phase 461 (FIGS. 2, 3, 5). Therefore, no screening has to take place here.

According to a variant 1, start condition 51 is the Nth bit of the CAN FD arbitration field (ISO 11898-1:2015), i.e., of arbitration field 452. Therefore, for detecting start condition 51 in received frame 45, 450, detect block 131 uses the bit-by-bit buildup of frame 45 according to the CAN FD protocol as a reference, as shown in FIG. 3 and described above.

In order for start condition 51, the Nth bit of the CAN FD arbitration field (ISO 11898-1:2015), i.e., of arbitration field 452, to function according to variant 1 mentioned above, the following arrangement on the bus applies:
CAN FD frames, i.e., frames 450, always transmit the Nth bit of frame 450 as "1," the Nth bit of frame 450 being counted beginning with the MSB bit
CAN FE frames, i.e., frames 45, always transmit the Nth bit of frame 45 as "0," the Nth bit of frame 45 being counted beginning with the MSB bit
The converse is also possible. In such an alternative, communication control devices 11, 31 always transmit the Nth bit of frame 450 as "0," and communication control devices 21, 31 always transmit the Nth bit of frame 45 as "1."
If prior to the Nth bit the CAN FD includes one or multiple bits in frame 450 that must have a fixed value (1 or 0), the CAN FE must also select this/these bit(s) in its frame 45 in the same way. This should almost always be possible via the selection of the identifier (ID) bits. The converse also applies.

According to one example, N=11; for CAN FD this is the 11th ID bit in frame 450 from FIG. 3, viewed from the MSB bit. Screening phase 460 thus begins in first communication phase 457 upon transmission of arbitration field 452. For CAN FD frame 450, this bit is always "1" (recessive). The following then applies:
CAN FD ID space: xxxxx 1 (x=0 or 1)
CAN FE ID space: xxxxx xxxxx 0xx . . . (x=0 or 1)
Instead of a bit, as an alternative a bit combination may be selected as start condition 51; for example, ID bits 8 through 11 must have the values "0011." In this case, detect block 131 detects, based on a bit field including more than one bit, whether or not start condition 51 for screening a CAN FE frame 45 is present.

The bit or bits for start condition 51 must be selected to be far enough at the start of frame 45, 450 that no conflict results between the CAN FD and the CAN FE frame format, CAN FE being an example of a future CAN-like protocol frame format.

According to a variant 2 for start condition 51, which detect block 131 is to detect, some other encoding of the dominant bus state could alternatively or additionally be used as start condition 51. For example, when a CAN FE frame 450 in the first bit of frame 450 dominantly transmits with VDIFF=5 V, which is much greater than with CAN FD, detect block 131 recognizes that a CAN FE frame 45 is now on the bus. VDIFF stands for the differential voltage of signals CAN_H–CAN_L.

Signals CAN_H and CAN_L, as shown for detect block 131 from FIG. 3, are necessary only when start condition 51 is encoded via the physical layer, as in this variant 2.

It is possible to hard-code start condition 51 or to configure start condition 51 as an alternative to the propagation time, in particular during the initial startup of bus system 1 or during maintenance of bus system 1.

Detect block 131 reports the occurrence of start condition 51 with the "detected" signal, referred to below as signal S_D, at screen block 132, for example via an edge change from 0 to 1. Detect block 131 thus generates signal S_D as the detection result.

Optionally, detect block 131 is additionally designed to interpret received CAN FE frames 45. Detect block 131 thus also knows the length of received CAN FE frames 45, and may thus also predict when received CAN FE frame 45 will end. Of course, the same applies for received CAN FD frames 450. The interpretation of particular received frame 45, 450 takes place using communication control devices 1311, 1312.

With regard to end condition 52 for the screening of received CAN FE frame 45, an end condition 52 is ideally fixedly programmed; however, as an alternative an end condition 52 could be configurable. Upon reaching end condition 52, the termination of the above-described screening operation is started. Since detect block 131 may interpret the CAN FE protocol at least in part, namely, using communication control unit 1312, end condition 52 is the recognition of an arbitrary location in frame 45, for example an acknowledge bit at the end of CAN FE frame 45, or a bit sequence in end field 456. Bits in end field 456 are very long compared to the bits in control field 453, data field 454, and check sum field 455, which allows the bits in end field 456 to be satisfactorily used as a bit sequence to be recognized. The reason is that temporally long phases of "0" or "1" of signal RXD1 cannot occur in control field 453, data field 454, or check sum field 455.

End condition 52 is selected in such a way that the CAN FD node, i.e., user station 10 in the present case, and the CAN FE node, i.e., user station 20 in the present case, are simultaneously prepared to transmit next frame 45, 450. Detect block 131 reports the occurrence of end condition 52 via signal S_D to screen block 132, for example via an edge change from 1 to 0. End condition 52 is selected in such a way that end condition 52 may be easily detected, and the screened user station may begin the transmission of next frame 45, 450 synchronously with the other user stations.

An end condition 52 must be provided for each type of termination of a CAN FE frame 45, for example:

First end condition 52: CAN FE frame 45 is ended normally.
Second end condition 52: CAN FE frame 45 is aborted due to an error.

Screen block 132, with the aid of reception signal selection block 133, ensures that the CAN FD node, i.e., user station 10 in the present example, upon receipt of a CAN FE frame 45 obtains signal RXDs, generated by screen block 132, as signal RX, and not signal RXD1 originally received from the transceiver. For this purpose, screen block 132 also generates a "select" signal, referred to below as select signal S_SL. Reception signal selection block 133 may be designed as a multiplexer.

Screen block 132 optionally synchronizes its bit limits with those of received CAN FE frame 450 with the aid of signal S_D. In addition, after end condition 52 is recognized it may be necessary for screen block 132 to be synchronized multiple times with the phase position at the bus. This may take place with the aid of signal RXD1, or optionally via a further "sync" signal, referred to below as synchronization signal S_SY, which is transmitted from detect block 131 to screen block 132.

Screen block 132 generates signal RX in such a way that the CAN FD node, i.e., communication control device 11 of user station 10, loses the arbitration if it is still in transmission mode. For this purpose, screen block 132 continues previously received CAN frame 45 with the aid of its generated reception signal RXDs. Screen block 132 transmits to communication control device 11 of user station 10 all ID bits of reception signal RXDs as dominant, so that the CAN FD node, i.e., user station 10, loses the arbitration.

As shown in FIG. 4, screen block 132 outputs signal RXDs as well as select signal S_SL to reception signal selection block 133.

It is optionally possible for screen block 132 to use signal TX of communication control device 11 in order to ensure that the CAN FD node, i.e., user station 10, has lost the arbitration. Screen block 132 recognizes this due to the fact that the CAN FD node, i.e., user station 10, still transmits only recessively ("1"). For this purpose, screen block 132 may also include a communication control device 1321 that compares signals TX, RXD1 to one another.

In addition, it is important that screen block 132 transmits the FDF bit=1 and the res bit=1 in signal RXDs. These two bits form a condition 53 (FIG. 5), and result in the CAN FD node, i.e., user station 10, more precisely, its communication control device 11, being changed into protocol exception state 459 (ISO 11898-1:2015), illustrated in FIG. 5. At this point, user station 10 (CAN FD node) waits for a sufficiently long recessive (1) bit sequence 54 (FIG. 5) in order to leave protocol exception state 459. Screen block 132 subsequently transmits at least each eleventh bit (utilizing the slow bit rate of the arbitration phase or of first communication phase 457) as dominant in order to ensure that user station 10 (CAN FD node), more precisely, its communication control device 11, remains in the protocol exception state. This is because eleven recessive bits would be interpreted by user station 10 (CAN FD node) in such a way that frame 45 is at the end, and user station 10 (CAN FD node) is once again allowed to transmit.

With the aid of signal RXD1, screen block 132 may comply with the bit stuffing rules upon continuation of arbitration field 452, using signal RXDs, since screen block 132 knows the history, i.e., the bits before the start condition was recognized. As mentioned above with reference to FIG. 3, according to the bit stuffing rule, after five identical bits a bit inverse thereto is to be inserted into a message 4. The bit stuffing rule may differ for message 5, so that, for example, after ten identical bits or some other number of bits a bit inverse thereto is to be inserted, as mentioned above with reference to FIG. 2.

As soon as screen block 132 from FIG. 4 receives end condition (communicated by detect block 131 with the aid of the "detected" signal, which may also be referred as S_D signal), screen block 132 transmits to user station 10 (CAN FD node) a bit sequence in signal RXDs that includes 11 contiguous recessive (logical "1") bits solely at the end. The length of the bit sequence is selected in such a way that user station 10 (CAN FD node) and other nodes or user stations 20, 30 at the bus synchronously attempt to transmit a new frame 45, 450 in the bit after this bit sequence. Subsequent to this bit sequence (i.e., after the 11 recessive bits), the screening operation is ended, and reception signal selection block 133 is once again switched in such a way that that the RXD1 bits from transceiver unit 120 pass through to communication control device 11 of user station 10 (CAN FD node). Communication control device 11 of user station 10 thus once again receives signal RXD1 as signal RX.

FIG. 5 shows an example of the mode of operation of the CAN FE screen block, based on a course of the above-mentioned signals as a function of time t. The following are assumed:

start condition 51: 11th bit of ID="0."
observed user station 10 (CAN FD node) transmits no frame 450 at this time.

FIG. 5 thus shows an example of a signal-time diagram for the function of the CAN FD transceiver with a CAN FE screen.

According to one modification of the exemplary embodiment described above, the principle of frame screening unit 130 is applied in order to screen CAN FD frame 450 for user station, if this is desired in an application. For this purpose, above-mentioned start condition 51 and end condition 52 are appropriately configured to screen CAN FD frame 450 for user station 20 instead of a CAN FE frame 45.

Figure 6:
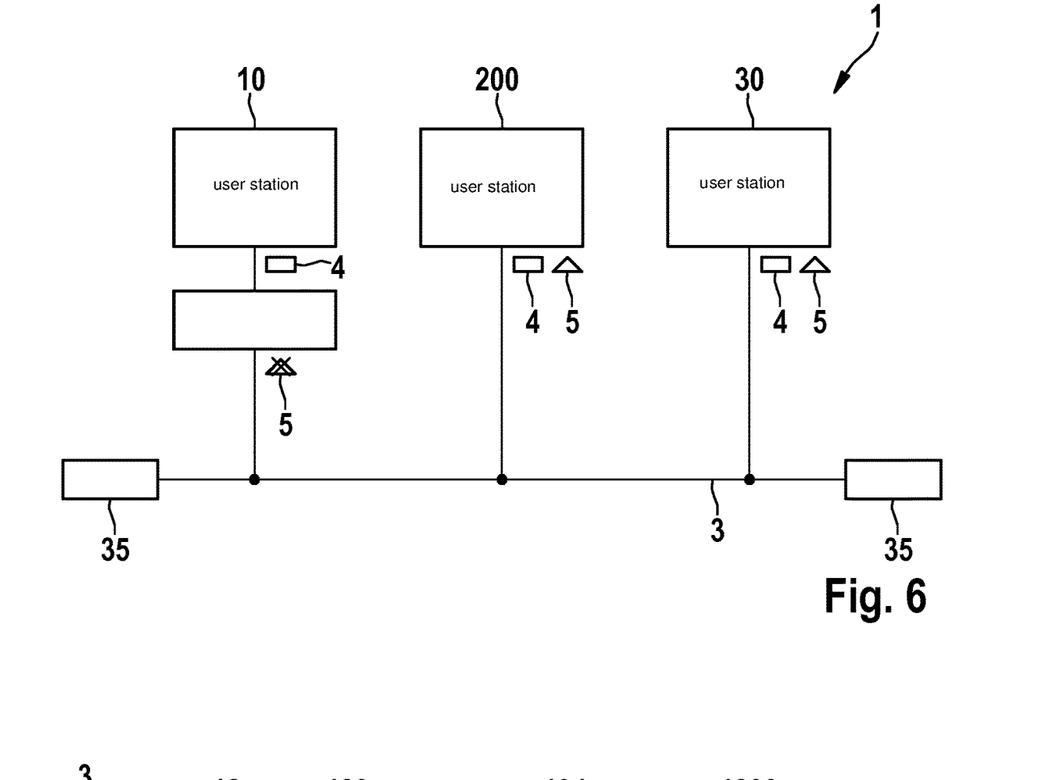
FIG. 6 shows a simplified block diagram of a bus system according to a second exemplary embodiment of the present invention.

FIG. 6 shows a second exemplary embodiment of a bus system 1. FIG. 6, in an illustration that is slightly modified compared to FIG. 1, shows a bus that includes a CAN FD node 10 and two CAN FE nodes 30, 200 as a further example of CAN FE and CAN FD user stations 10, 30, 200. The nodes or user stations 10, 30, 200 in FIG. 6 are also connected to a bus line 3. The bus that is formed by bus line 3, the same as bus line 3 from FIG. 1, includes a bus termination denoted by reference numeral 35. Termination 35 is a resistor having a value of 120 ohms, in particular according to the CAN protocol specification mentioned above.

In the second exemplary embodiment, in contrast to the first exemplary embodiment according to the preceding figures, the nodes or user stations 30, 200 support the CAN FE protocol as well as the CAN FD protocol. Thus, user station 200, in contrast to user station 20 from FIG. 1, requires no frame screening unit 230. The nodes or user stations 10, 30, 200 arbitrate for the bus access. Frame 45, 450 having the highest priority passes through on the bus and is transmitted.

Figure 7:
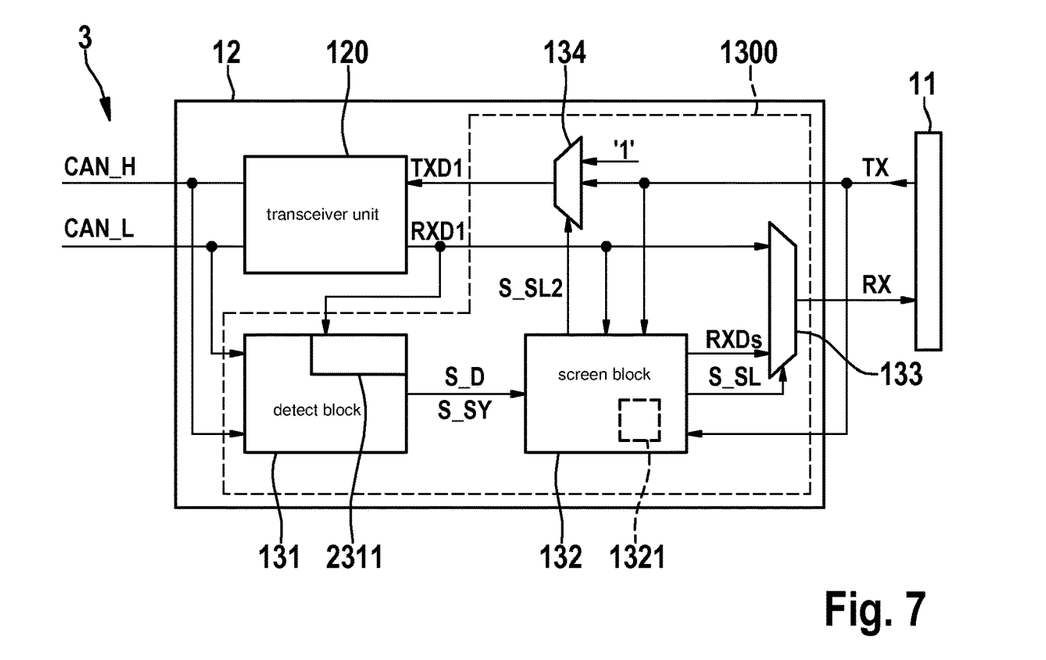
FIG. 7 shows a diagram for illustrating the design of a frame screening unit that is installed in user stations of the bus system according to a second exemplary embodiment of the present invention.

Incidentally, user stations 10, 30, 200 have the same functions as described above with regard to the preceding exemplary embodiment. FIG. 7 shows a frame screening unit 1300 according to a third exemplary embodiment for bus systems 1 described above. FIG. 7 shows a further option that is usable, depending on the design of the CAN FE protocol. Frame screening unit 1300, in addition to the blocks of frame screening unit 130 from FIG. 4, includes a transmission signal selection block 134. Screen block 132 generates a select signal S_SL2 that is input into transmission signal selection block 134. Select signal S_SL2 may also be referred to as a "select2" signal. Transmission signal selection block 134 may be designed as a multiplexer.

In frame screening unit 1300 it is taken into account that CAN FE and CAN FD may be so different that it is not always possible that the CAN FD node (user station 10, for example) is prepared to transmit on the bus once more, synchronously with the end of CAN FE frame 45, including the distance between two successive frames 45, 450 (interframe space). In this case, it may be necessary to prevent the CAN FD protocol controller (communication control device 11, for example) from transmitting anything on the bus via a TXD connection (pin).

As shown in FIG. 7, for this purpose screen block 132 switches transmission signal selection block 134 with the aid of select signal S_SL2 in such a way that, instead of signal TX of communication control device 11 (CAN FD protocol controller), a logical "1" (recessive, bus voltage not driven) is delivered to transceiver unit 120 (CAN FD transceiver). This state is maintained until the CAN FD node (user station 10, for example) is once again allowed to transmit on the bus, synchronously with the end of CAN FE frame 45 (including the distance between two successive frames 45, 450 according to the interframe space).

As a result, signal TX of communication control device 11 does not interfere with the transmission of the one CAN FE frame 45.

All of the above-described embodiments of frame screening units 130, 230, 1300, of user stations 10, 20, 30, 200 of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Above-described bus system 1 according to the exemplary embodiments is described with reference to a bus system based on the CAN protocol. However, bus system 1 according to the exemplary embodiments may also be some other type of communications network in which data are serially transmittable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30, 200 of bus system 1 of the exemplary embodiments is arbitrary. It is possible for one or more of user stations 10 to be present in bus system 1. It is possible for one or more of user stations 20 to be present in bus system 1. It is possible for one or more of user stations 30 to be present in bus system 1. It is possible for one or more of user stations 200 to be present in bus system 1.

The following is possible: a user station 10; 20; 30 for a serial bus system 1, including a communication control device 11; 21; 31 for creating a message 4; 5; 50; 500 that is to be serially transmitted to at least one further user station 20; 30; 10 of bus system 1, or for reading a message 4; 5; 50; 500 that has been serially received from at least one further user station 20; 30; 10 of bus system 1, and a transceiver 12; 22; 32 for transmitting created message 4; 5; 50; 500 on a bus line 3 to at least one further user station 20; 30; 10 of bus system 1 or for receiving a message 4; 5; 50; 500 from bus line 3; communication control device 11; 21; 31 and/or transceiver device 12; 22; 32 are/is designed to provide in message 4; 5; 50; 500 to be transmitted an ACK time window 46 for an ACK signal 461 and/or a NACK time window 47 for a NACK signal 471 for signaling whether or not at least one further user station 20; 30; 10 has detected an error in transmitted message 4; 5; 50; 500, and transceiver device 12; 22; 32 being designed to drive no level on bus line 3 in the at least one provided time window 46, 47 during transmission to the at least one further user station 20; 30; 10.

What is claimed is:

1. A frame screening unit for a user station for a serial bus system, the frame screening unit comprising:
a screen block configured to generate a select signal that selects whether or not a communication control device of the user station is allowed to receive a reception signal that has been generated from a frame for a message that is serially received at that time from a bus; and a reception signal selection block configured to screen the reception signal as a function of the select signal generated by the screen block, in a manner that the reception signal is not transmitted to the communication control device of the user station.

2. The frame screening unit as recited in claim 1, wherein:
the screen block is configured to generate, instead of the reception signal of the frame received from the bus, another reception signal in such a way that the communication control device of the user station goes into a protocol exception state in which the communication control device abandons a transmission of a transmission signal to the bus, and the reception signal selection block is configured to transmit the other reception signal, generated by the screen block, to the communication control device of the user station as a function of the select signal generated by the screen block.

3. The frame screening unit as recited in claim 1, wherein the screen block is configured to place a flexible data-rate format (FDF) bit and a resolution (res) bit in the other reception signal, generated by the screen block, in such a way that the communication control device of the user station goes into a protocol exception state in which the communication control device abandons a transmission of a transmission signal to the bus.

4. The frame screening unit as recited in claim 1, further comprising:
a detect block configured to detect, from the frame serially received from the bus, a start condition and an end condition for the screening of the reception signal that has been generated from frame serially received from the bus,
wherein the screen block is configured to generate the select signal as a response to a detection result of the detect block.

5. The frame screening unit as recited in claim 4, wherein: (i) the detect block is configured to carry out a sequential decoding of the reception signal for evaluating the reception signal, and/or (ii) the detect block configured to evaluate the reception signal in order to find the start condition and/or end condition, based on a format of a frame whose data transmission standard is understood by the communication control device of the user station.

6. The frame screening unit as recited in claim 4, wherein: (i) the detect block is configured to detect and evaluate a state on the bus in order to detect the start condition and the end condition, and/or (ii) the detect block is designed to evaluate a digital reception signal, generated from the frame received from the bus, to detect the start condition and the end condition.

7. The frame screening unit as recited in claim 4, wherein the detect block is configured to output to the screen block a detection signal in which the start condition is encoded as an edge change that differs from an edge change for the end condition.

8. The frame screening unit as recited in claim 4, wherein portions of the frame, which are transmitted via a data transmission standard that the communication control device of the user station does not understand, are also contained between the start condition and the end condition.

9. The frame screening unit as recited in claim 4, wherein: (i) the start condition is a predetermined value of at least one bit of the reception signal that has been generated from an arbitration field of the frame serially received at that time from the bus, and/or (ii) the start condition is a predetermined value of at least one state of signals on the bus, the end condition being defined after the end of a communication phase in which useful data of the frame are transmitted via a data transmission standard that the communication control device of the user station does not understand.

10. The frame screening unit as recited in claim 1, further comprising:
a transmission signal selection block configured to select a transmission signal, in which all bits are transmitted in such a way that their bus states on the bus are overwritable until an end of the received frame is reached.

11. The frame screening unit as recited in claim 1, wherein in a first communication phase for transmitting the message on the bus it is negotiated, between user stations of the bus system, which of the user stations in a subsequent second communication phase has, at least temporarily, exclusive, collision-free access to the bus of the bus system, the second communication phase encompassing the transmission of a data field in which useful data of the message are transmitted on the bus.

12. A user station for a serial bus system, the user station comprising:
a communication control device configured to transmit a message to a bus of the bus system and/or to receive the message from the bus of the bus system;
a transceiver device configured to transmit the message on the bus and/or to receive messages from the bus; and
a frame screening unit connected to the communication control device and to the transceiver device, the frame screening unit including:
a screen block configured to generate a select signal that selects whether or not the communication control device of the user station is allowed to receive a reception signal that has been generated from a frame for the message that is serially received at that time from the bus; and
a reception signal selection block configured to screen the reception signal as a function of the select signal generated by the screen block, in a manner that the reception signal is not transmitted to the communication control device of the user station, the transceiver device being configured to, regardless of a bit rate of the frame of the message, generate during the transmission a first bus state for a first digital data state of the messages, and a second bus state for the second digital data state of the messages, in such a way that the second bus state overwrites the first bus state.

13. A bus system comprising:
a bus;
at least one first user station including:
a communication control device configured to transmit a message to a bus of the bus system and/or to receive the message from the bus of the bus system,
a transceiver device configured to transmit the message on the bus and/or to receive messages from the bus, and
a frame screening unit connected to the communication control device and to the transceiver device, the frame screening unit including:
a screen block configured to generate a select signal that selects whether or not the communication control device of the user station is allowed to receive a reception signal that has been generated from a frame for the message that is serially received at that time from the bus, and a reception signal selection block configured to screen the reception signal as a function of the select signal generated by the screen block, in a manner that the reception signal is not transmitted to the communication control device of the user station, the transceiver device being configured to, regardless of a bit rate of the frame of the message, to generate during the transmission a first bus state for a first digital data state of the messages, and a second bus state for the second digital data state of the messages, in such a way that the second bus state overwrites the first bus state; and at least one second user station connected to the at least one first user station via a bus line for the bus in such a way that the at least one first user station and the at least one second user station communicates serially with one another, the data transmission standard of frames for messages of the at least one first user station differing, at least in part, from a data transmission standard of the at least one second user station.

14. A method for communicating in a serial bus system, the method comprising:

transmitting, via a transceiver device, messages on a bus of the bus system and/or receiving, via the transceiver device, messages from the bus of the bus system;

generating, via a screen block of a frame screening unit, a select signal that selects whether or not a communication control device of a user station of the bus system is allowed to receive a reception signal that has been generated from a frame for a message received serially from the bus at that time; and screening, via a reception signal selection block, the reception signal as a function of the select signal generated by the screen block, in a manner that the reception signal is not transmitted to the communication control device of the user station.

* * * * *